(12) United States Patent
Kadota

(10) Patent No.: US 7,644,104 B2
(45) Date of Patent: Jan. 5, 2010

(54) IMAGE DATA TRANSMISSION SYSTEM AND PROGRAM FOR IMAGE DATA TRANSMISSION SYSTEM

(75) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 400 days.

(21) Appl. No.: 11/565,122

(22) Filed: Nov. 30, 2006

(65) Prior Publication Data

US 2007/0121154 A1 May 31, 2007

(30) Foreign Application Priority Data

Nov. 30, 2005 (JP) ............................. 2005-346382

(51) Int. Cl.
*G06F 17/00* (2006.01)
(52) U.S. Cl. .................... 707/104.1; 707/101; 707/102; 707/103 R
(58) Field of Classification Search ............... 707/1–10, 707/100–14.1, 200–206
See application file for complete search history.

(56) References Cited

OTHER PUBLICATIONS

Sweet, Michael R., "CUPS: Common Unix Printing System," Piason Education Co., Ltd. Aug. 20, 2002.

U.S. Appl. No. 11/580,073, filed Oct. 13, 2006, Masatoshi Kadota, first named inventor.

*Primary Examiner*—Isaac M Woo
(74) *Attorney, Agent, or Firm*—Banner & Witcoff, Ltd

(57) ABSTRACT

An image data transmission system includes: a first procedure section includes: a path name acquisition unit that acquires a path name of a file; a directory path name specifying unit that specifies a path name of a directory associated with a character string; a path name conversion unit that converts the character string into the path name of the directory; a converted path name providing unit that provides the converted path name; and an image data providing unit that provides an image data; and a second procedure section comprises: a converted path name acquisition unit that acquires the path name; a data reading unit that reads file data stored in the file; an image data acquisition unit that acquires the image data; and a data processing unit that performs a process of the image data, using the file data and the image data.

9 Claims, 10 Drawing Sheets

IMAGE DATA TRANSMISSION SYSTEM AND PROGRAM FOR IMAGE DATA TRANSMISSION SYSTEM

CROSS-REFERENCE TO THE RELATED APPLICATION(S)

This application is based upon and claims priority from prior Japanese Patent Application No. 2005-346382 filed on Nov. 30, 2005, the entire content of which is incorporated herein by reference.

TECHNICAL FIELD

The present invention relates to an image data transmission system provided on a computer to send the image data from the computer to an image processing device, and a program for implementing the image data transmission system.

BACKGROUND

Conventionally, a printing system called a common UNIX (registered trademark) printing system (CUPS) is employed in a computer mounting a UNIX (registered trademark) like OS (refer to "CUPS: Common Unix Printing System using the new generation printing system", first edition, Piason Education Co. Ltd., Aug. 20, 2002, written by Michael R. Sweet, translated by Oki Data CUPS project).

In this CUPS, a plurality of processes operating on a computer cooperate to perform the data processings in succession to send the image data from the computer to an image processing device. For example, when the print data is outputted from an application process, its print data is sent through a CUPS LPR command process, a CUPS spool system and a CUPS back end process to a printer or a facsimile apparatus that is the image processing device.

SUMMARY

When the image data is sent to the image processing device using the CUPS, the data to be send can be transmitted from a process on the upstream side in the data transmission direction to a process on the downstream side by employing a standard input/output, for example. Also, when the image data is already stored in a file, data can be passed to a spooler system provided for the CUPS by designating the path name of the file, and the data read from its file can be transmitted to a process on the downstream side of the spooler system. If other data is desired to transmit, the data itself may be passed as a parameter in a command line in such a case. Also, when larger data is desired to pass, the data is stored in a file, the path name of the file is passed as the parameter in the command line, and the data is acquired by accessing the file on a process receiving the path name.

However, some of the processes operating on the CUPS operate on a user account (hereinafter referred to as a user process), and the other processes operate on a system account (hereinafter referred to as a system process). Therefore, for the file for other than the image data that is the main data, if the character string correctly recognizable through the user process alone is contained in the path name of the file as the parameter in the command line designated by the user, or the path name is a relative path on the basis of the current directory for the user process, for example, an error may arise when the system process attempts to access the file.

When the same facsimile image is transmitted to a plurality of transmission destinations by transmitting the image data for the facsimile image and a plurality of FAX numbers from a computer to a facsimile apparatus having a broadcast communication function, the data may be transmitted from the computer to the facsimile apparatus using the CUPS. In this case, the image data for the facsimile image can be transmitted from the upstream side in the data transmission direction to the downstream side, using the standard input/output. If the image data is already stored in the file, the image data can be designated by the path name of the file. Also, the plurality of FAX numbers are stored in the file, and the path name of the file is designated as the parameter in the command line, so that the parameter can be transmitted from the upstream side in the data transmission direction to the downstream side.

However, in the UNIX (registered trademark) like OS, a "~ (tilde)" indicating the home directory of the user, or a "." (period)" indicating the current directory may be employed in a part of the path name. Therefore, regarding the file for other than the image data, there was a problem that if these characters (or character string) are contained in the path name designated by the user, the system process recognizes that the file exists in the directory different in the absolute path from the directory as intended by the user, an error may arise in accessing the file.

Aspects of the invention are to provide an image data transmission system that can transmit data to an image processing device by accessing a file correctly on a system process, even if a character string that can be recognized correctly by the user process alone is contained in the path name designated by the user, and a program for implementing the image data transmission system.

According to an aspect of the invention, there is provided an image data transmission system which transmits data from a computer to an image processing device, the image data transmission system including: a first procedure section; and a second procedure section, wherein the first procedure section includes: a path name acquisition unit that acquires a path name of a file to be processed; a directory path name specifying unit that specifies a path name of a directory associated with a character string which is at least one part of the path name acquired by the path name acquisition unit; a path name conversion unit that converts the character string which is at least one part of the path name acquired by the path name acquisition unit into the path name of the directory specified by the directory path name specifying unit; a converted path name providing unit that provides the path name converted by the path name conversion unit to the second procedure section; and an image data providing unit that provides image data to be processed to the second procedure section; the second procedure section includes: a converted path name acquisition unit that acquires the path name provided from the first procedure section; a data reading unit that reads file data stored in the file specified by the path name acquired by the converted path name acquisition unit; an image data acquisition unit that acquires the image data provided from the first procedure section; and a data processing unit that performs a process of the image data, using the file data read by the data reading unit and the image data acquired by the image data acquisition unit; and different path names are specified by the first procedure section and the second procedure section with respect to the same character string.

According to the above aspect, in the first procedure section, when the character string which is at least one part of the path name of the file to be processed is the character string associated with the path name of the specific directory, the used character string is converted into the path name of the specific directory, and the path name after conversion is provided to the second procedure section. Therefore, in the second procedure section, the file to be processed can be accessed appropriately, although the correspondence between the path name of the directory provided for the first procedure section and the character string can not be recognized. Accordingly, a process regarding the image data including the data transmission process to the image processing device can be properly performed, using the file data read from the file to be processed and the image data acquired from the first procedure section in the second procedure section.

According to another aspect of the invention, there is provided a computer program product for enabling a computer to have an image data transmission function for an image data transmission system that includes a first procedure-section and a second procedure section, the computer program product including: software instructions for enabling the computer to perform predetermined operations for the first procedure section; and a computer readable medium bearing the software instruction, wherein: the predetermined operations includes: acquiring the path name of a file to be processed; specifying the path name of the directory associated with a character string which is at least one part of the acquired path name; converting the character string which is at least one part of the path name acquired by the path name acquiring into the path name of the specified directory; providing the path name converted by the path name converting to the second procedure section; and providing the image data to be processed to the second procedure section; and different path names are specified by the first procedure section and the second procedure section with respect to the same character string.

According to this aspect, the first procedure section constituting the image data transmission system according to the aspect can be operable on the computer. Accordingly, the image data transmission system according to the above can be constituted employing this program along with the program for operating the remaining other process on the computer.

According to another aspect of the invention, there is provided a computer program product for enabling a computer to have an image data transmission function for an image data transmission system that includes a first procedure section and a second procedure section, the computer program product including: software instructions for enabling the computer to perform predetermined operations for the second procedure section; and a computer readable medium bearing the software instruction, wherein: the predetermined operations includes: acquiring a path name provided from the first procedure section; reading file data stored in the file specified by the acquired path name; acquiring the image data provided from the first procedure section; and performing a process of the image data, using the file data read by the data reading and the image data acquired by the image data acquiring; and different path names are specified by the first procedure section and the second procedure section with respect to the same character string.

According to another aspect of the invention, there is provided a computer program product for enabling a computer to have an image data transmission function for an image data transmission system that includes a first procedure section and a second procedure section, the computer program product including: software instructions for enabling the computer to perform predetermined operations for the first procedure section; and a computer readable medium bearing the software instruction, wherein: the predetermined operations includes: acquiring a path name of a file to be processed; reading file data stored in a file having the path name based on the acquired path name; providing the read file data to the second procedure section; and providing image data to be processed to the second procedure section; and different path names are specified by the first procedure section and the second procedure section with respect to the same character string.

According to another aspect of the invention, there is provided a computer program product for enabling a computer to have an image data transmission function for an image data transmission system that includes a first procedure section and a second procedure section, the computer program product including: software instructions for enabling the computer to perform predetermined operations for the second procedure section; and a computer readable medium bearing the software instruction, wherein: the predetermined operations includes: acquiring file data provided from the first procedure section; acquiring image data provided from the first procedure section; and performing a process of the image data, using the acquired file data and the acquired image data; and different path names are specified by the first procedure section and the second procedure section with respect to the same character string.

According to another aspect of the invention, there is provided a computer program product for enabling a computer to have an image data transmission function for an image data transmission system that includes a first procedure section and a second procedure section, the computer program product including: software instructions for enabling the computer to perform predetermined operations for the first procedure section; and a computer readable medium bearing the software instruction, wherein: the predetermined operations includes: acquiring a path name of a file to be processed; copying a file from a file having the acquired path name as a copy source to a file having the path name accessible from the second procedure section as a copy destination; and providing the image data to be processed to the second procedure section and different path names are specified by the first procedure section and the second procedure section with respect to the same character string.

According to another aspect of the invention, there is provided a computer program product for enabling a computer to have an image data transmission function for an image data transmission system that includes a first procedure section and a second procedure section, the computer program product including: software instructions for enabling the computer to perform predetermined operations for the second procedure section; and a computer readable medium bearing the software instruction, wherein: the predetermined operations includes: reading file data stored in a copy destination file that is copied in the first procedure section; acquiring image data provided from the first procedure section; and performing a process of the image data, using the read file data and the acquired image data; and different path names are specified by the first procedure section and the second procedure section with respect to the same character string.

In each invention as described above, the first and second procedure sections are processing units for implementing the respective functions, in which each process may be the single process or a combination of plural small processes to implement the functions of each process as a whole. Ina specific example, in implementing the functions of the first procedure section, a parent process generates a child process for implementing a partial function, and the parent process and the child process cooperate to operate as the first procedure section, in which the parent process and the child process correspond to the first procedure section as defined in this invention, and it is not required that the first procedure section is the single process. This point is also the same with the procedure section.

Also, the "character string having the correspondence with the path name of the directory" as described in this invention may be the character string composed of one character or an array of two or more characters.

DETAILED DESCRIPTION

The aspects of the present invention will be described below using specific examples.

A first aspect of the invention will be described below.

Figure 1:
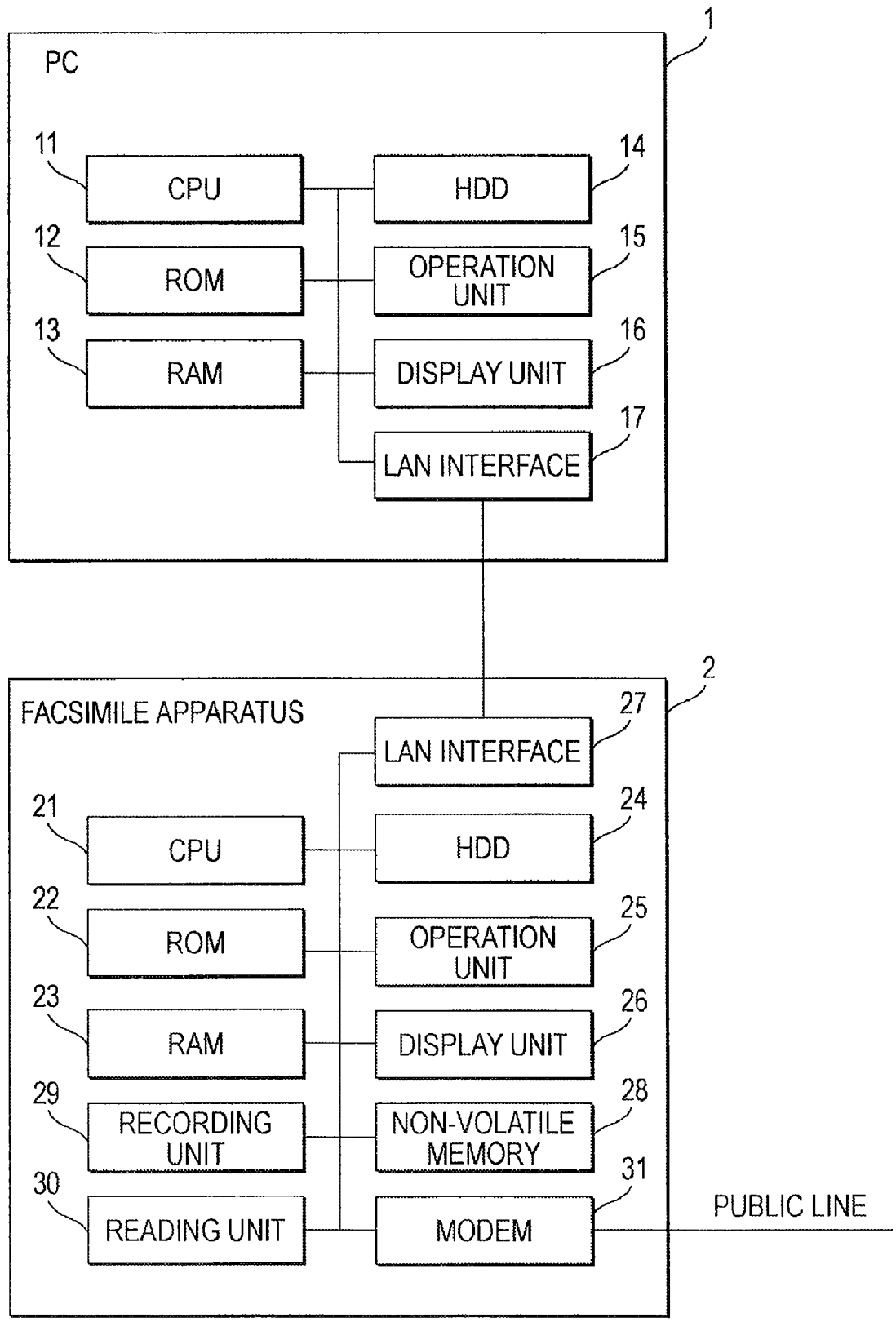
FIG. 1 is a block diagram showing the configuration of a PC and a facsimile apparatus.

FIG. 1 is a block diagram showing the configuration of a personal computer 1 (hereinafter abbreviated as a PC 1) and a facsimile apparatus 2 that can communicate with this PC 1.

The PC 1 includes the hardware such as a CPU 11, a ROM 12, a RAM 13, a hard disk device 14 (hereinafter referred to as an HDD 14), an operation unit 15, a display unit 16, and an LAN interface 17, and mounts a Linux (registered trademark) as an OS (Operating System) for controlling the hardware.

The CPU 11 is a processor that executes various kinds of program stored in the ROM 12 or HDD 14. The RAM 13 is a random access memory having an area storing the program stored in the HDD 14 and a work area temporarily storing the variables, when the CPU 11 executes various kinds of program.

The HDD 14 is a non-volatile storage device having a relatively large storage capacity, which stores the program files for the Linux that is the OS, the CUPS (common UNIX (registered trademark) Printing System), a FAX driver having a function of transmitting a fax with the CUPS, and other various kinds of application and a broadcast communication file storing a plurality of transmission destinations to which the facsimile apparatus 2 transmits data.

The operation unit 15 includes a keyboard having a plurality of keys corresponding to alphabets, numbers and symbols and capable of inputting the character or symbol, and a pointing device (e.g., mouse) capable of setting the cursor displayed on the display unit 16 at any position, or making an operation by clicking the icon.

The display unit 16 is a display unit made of liquid crystal, for example, which displays a set-up screen on which various values are set up by the user, if the program is executed by the CPU 11, and an image formed based on the set values.

The LAN interface 17 is the interface for making the communications via a LAN (Local Area Network) cable or a wireless LAN with the peripheral devices, other computers or a server. The PC 1 is connected via the LAN interface 17 to the facsimile apparatus 2, whereby the transmission information is transmitted from the PC 1 to the facsimile apparatus 2, or the reception information received by the facsimile apparatus 2 is transmitted from the facsimile apparatus 2 to the PC 1.

The facsimile apparatus 2 has a facsimile function of transmitting the image information received from the PC 1 to a transmission partner designated by the PC 1 or transmitting the received image information to the PC 1, and a printer function of printing the image information received from the PC 1. This facsimile apparatus 2 includes a CPU 21, a ROM 22, a RAM 23, a hard disk device 24 (hereinafter referred to as an HDD 24), an operation unit 25, a display unit 26, a LAN interface 27, a non-volatile memory 28, a recording unit 29, a reading unit 30 and a modem 31.

The CPU 21 performs the control and arithmetic operation for each part of the facsimile apparatus 2 in accordance with a program stored in the ROM 22.

The ROM 22 is a read-only memory that stores the program and data required for controlling the facsimile apparatus 2.

The RAM 23 is a readable/writable memory that stores various kinds of data used by the CPU 21. Since the RAM 23 has a higher access speed than the non-volatile memory 28 or the HDD 24, a part of data stored in the non-volatile memory 28 or the HDD 24 is transferred to the RAM 23 and then employed, while the facsimile apparatus 2 is working.

The HDD 24 is the device prepared for storing the data having a relatively large size, and temporarily accumulates the image data (image data read by the reading unit 30 or image data received via the modem 31, etc.) transmitted or received with the facsimile function.

The operation unit 25 is an input device that the user manipulates to give various kinds of command to the facsimile apparatus 2.

The display unit 26 is composed of a liquid crystal display.

The LAN interface 27 is the device that controls the communications with the LAN 7.

The non-volatile memory 28 can hold the storage contents with a built-in battery, even when a power switch of the facsimile apparatus 2 is turned off. This non-volatile memory 28 stores address note data and various kinds of set-up data.

The recording unit 29 is a unit that records (prints) the image represented by the image data on the sheet-like medium (e.g., recording sheet), and is activated in printing the received image with the facsimile function, printing the image with the printer function, and printing the copy image with the copy function.

The reading unit 30 reads an image from the original to generate the image data representing the image, and is activated in reading the transmitted image with the facsimile function.

The modem 31 is a unit for use to transmit or receive the facsimile image and make the voice communication via the public phone line.

Figure 2:
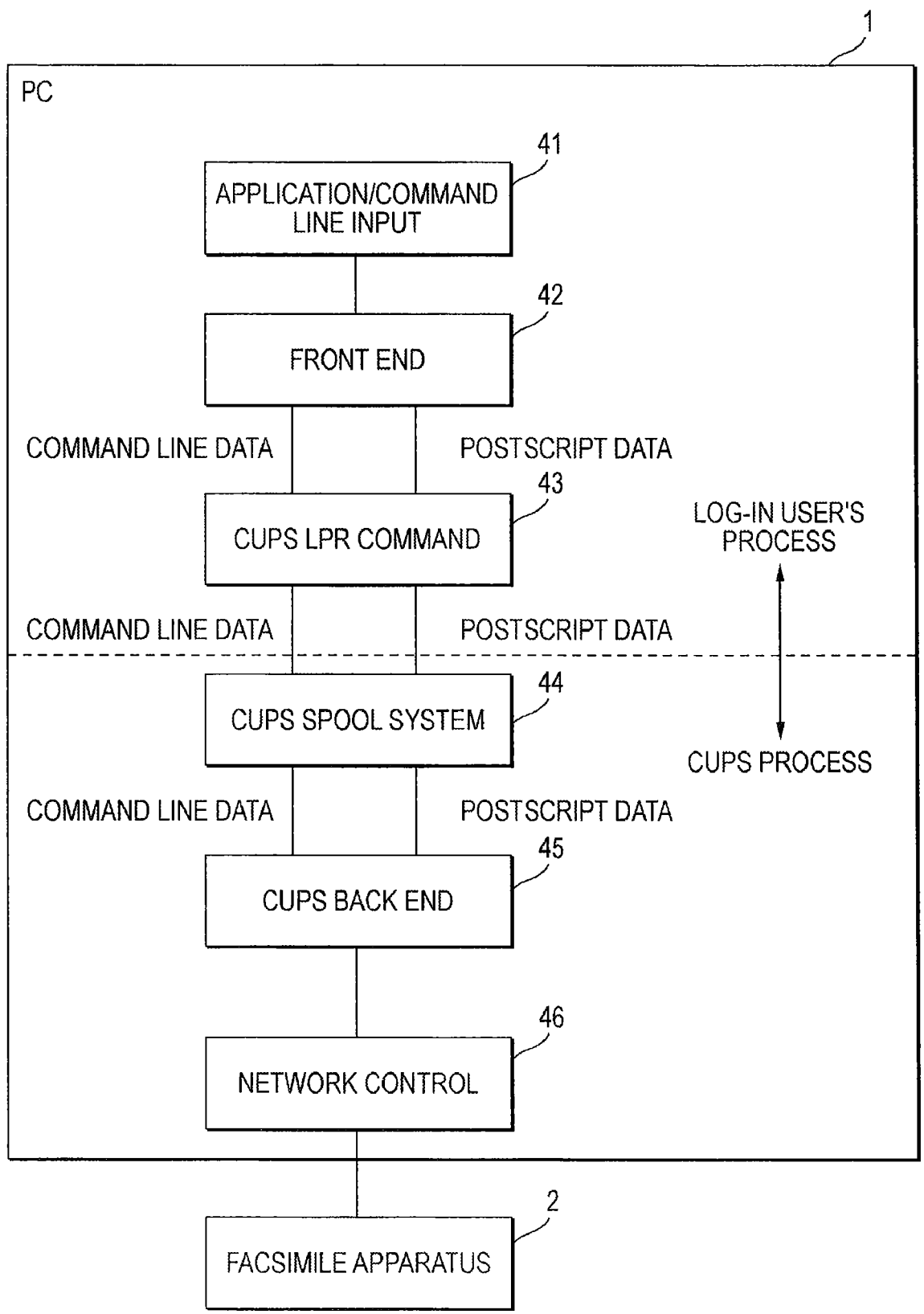
FIG. 2 is a block diagram showing the configuration of processes or systems related with an image data transmission system provided for the PC.

FIG. 2 is a block diagram showing the processes or systems related with the image data transmission system excerpted from among the processes or systems providing various kinds of functions in the PC 1. In the PC 1, these plural processes or systems cooperate to make the data processings in succession, so that the image data transmission system operates to transmit the image data from the PC 1 to the facsimile apparatus 2.

In more detail, the image data transmission system is configured as a FAX transmission system in this aspect, and includes an application/command line input unit 41, a front end unit 42, a CUPS LPR command unit 43, a CUPS spool system unit 44, a CUPS back end unit 45, and a network control unit 46.

The application/command line input unit 41 has a process corresponding to various kinds of application, or a process for accepting a command line input. The application is the software including various kinds of editor having a function of editing the data of composition or graphics as the facsimile image to output the data to a process at lower level (front end unit 42), for example. From the application, the print data itself can be outputted as a data stream to the front end unit 42 by designating the front end unit 42 of output destination. Also, a command line input is provided as the functions of the OS, for example, including a function of transferring the file name (path name) for the data edited beforehand by various kinds of editor and stored in the file to the lower layer process (front end unit 42) by inputting the file name (path name) as a parameter (argument) in the command line and a function of conveying the data stream to the lower layer process (front end unit 42) by connecting the output data to standard output through a pipe to standard input in the lower layer process. In this manner, the application and the command line input are slightly different functionally, but play the same role in the respect of passing various kinds of data to be processed to the front end unit 42, and therefore both are generically referred to as the application/command line input unit 41 in this aspect. In the following explanation, it is supposed that the image data becoming the facsimile image is created beforehand by the editor, and stored in a file as the data in the postscript (registered trademark) format, and the application/command line input unit 41 inputs the image data stored in the file, and outputs the input image data as the data stream to the front end unit 42. The path name of the file storing the image data can be passed to the front end unit 42 at this stage as described above.

The front end unit 42 has a process of receiving the data from the application/command line input unit 41, and further collecting the information required in the transaction of the CUPS back end unit 45 or processing the data to send the data to the CUPS LPR command unit 43. In this aspect, the data stream inputted from the application/command line input unit 41 is outputted from the front end unit 42 to the CUPS LPR command unit 43, and the FAX number for the destination of transmitting the facsimile image or the path name of the file storing the FAX number is sent out as the command line data. When the path name of the file storing the image data is passed from the application/command line input unit 41 to the front end unit 42, the path name of the file is passed from the front end unit 42 to the CUPS LPR command unit 43.

The CUPS LPR command unit 43 has a process of accepting a print command from an upper layer process (the front end unit 42 in this aspect) and sending the data stream received from the upper layer process to the CUPS spool system unit 44 to create the print jobs to be processed in the FIFO order. When the path name of the file storing the image data is passed from the front end unit 42 to the CUPS LPR command unit 43, the image data is read from the file the CUPS LPR command unit 43 and the read image data is sent out as the data stream to the spool system unit 44.

The CUPS spool system unit 44 is a system for managing the print job generated based on a print command accepted from the CUPS LPR command unit 43.

The CUPS back end unit 45 has a process of inputting the print data sent successively from the spool system unit 44 and creating the FAX transmission data (image data in PDL (Printer Description Language)) adaptable to the specifications of the facsimile apparatus 2 to transmit the facsimile image indicated by its data to the facsimile apparatus 2. In this aspect, since the output destination is the facsimile apparatus 2, the image data is converted into the FAX transmission data in this CUPS back end unit 45. However, if the output destination is the printer or the like, the data adaptable to the specifications of the printer is created in the CUPS back end unit 45.

The network control unit 46 has a process of packetizing the FAX transmission data formed in the CUPS back end unit 45 to transmit it via the LAN.

As described above, this FAX transmission system is constructed on the CUPS system, and handles the postscript (registered trademark) data as the input data. The input of this post-script data is made in the front-end unit 42. The user can print the print data in the postscript (registered trademark) created by the application by registering a front end program in the application. Also, when the already created postscript (registered trademark) data is printed, it can be printed by calling this front end with the postscript (registered trademark) data as the argument in the command line on a console screen.

Of the plural processes or systems as described above, each of the processes constituting the application/command line input unit 41, the front end unit 42, and the CUPS LPR command unit 43 is operable on the account of the log-in user, while each of the processes constituting the CUPS spool system unit 44, the CUPS back end unit 45 and the network control unit 46 is operable on the account of the CUPS (system). Therefore, the environmental variable intrinsic to the process functioning on the user account can be referred to by the front end unit 42, but the environmental variable intrinsic to the process functioning on the user account can not be referred to by the CUPS back end unit 45, for example. To cope with this, the front end unit 42 converts the data that can not be handled without referring to the environmental variable intrinsic to the process functioning on the user account into the data that can be handled without referring to the environmental variable intrinsic to the process functioning on the user account through a process as will be described later, whereby the proper process can be performed in the CUPS back end unit 45.

Of the plural processes or systems as described above, the CUPS LPR command unit 43 and the CUPS spool system unit 44 become a part corresponding to the standard function provided for the CUPS, and such standard function can not be changed arbitrarily, but the front end unit 42 and the CUPS back end unit 45 can optionally mount a program adaptable to the type or function of the facsimile apparatus 2.

Figure 3:
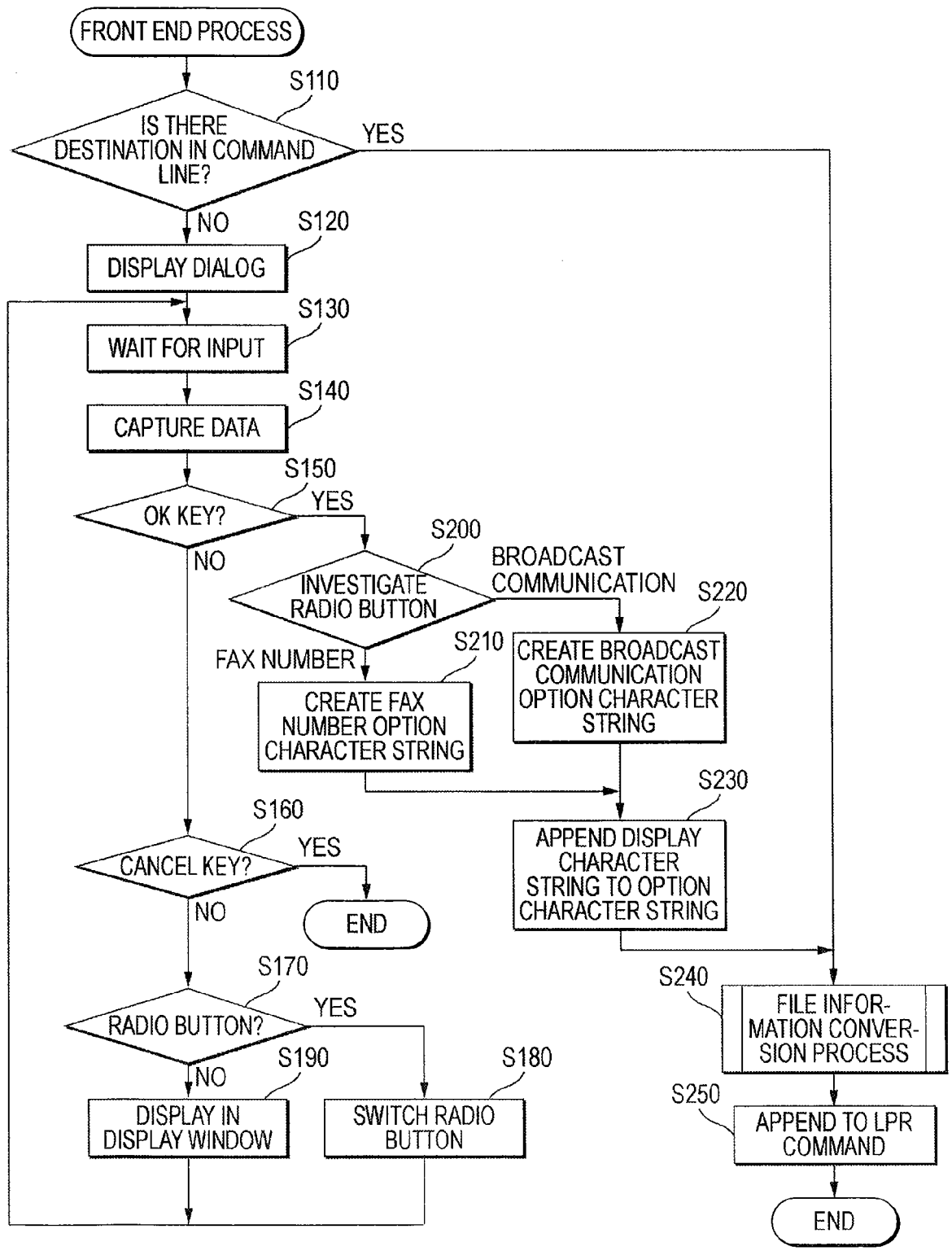
FIG. 3 is a flowchart of a front end process.

Referring to FIG. 3, a process (front end process) performed by the front end unit 42 will be described below.

If this process is started, the PC 1 firstly judges whether or not there is a destination (transmission destination of the facsimile image) in the command line passed from the application/command line input unit 41 (S110). Specifically, at step S110, it is judged whether or not an option character string "fax-broadcast=" or an option character string "fax-number=" is contained in the command line. If any of these option character strings is contained, it is judged that there is the destination (S110: YES), and a process for acquiring the destination (from S120 to S230 as will be described later) is skipped, while if none of the option character strings is contained, it is judged that there is no destination (S110: NO), the procedure goes to the process for acquiring the destination (from S120 to S230).

Figure 4:
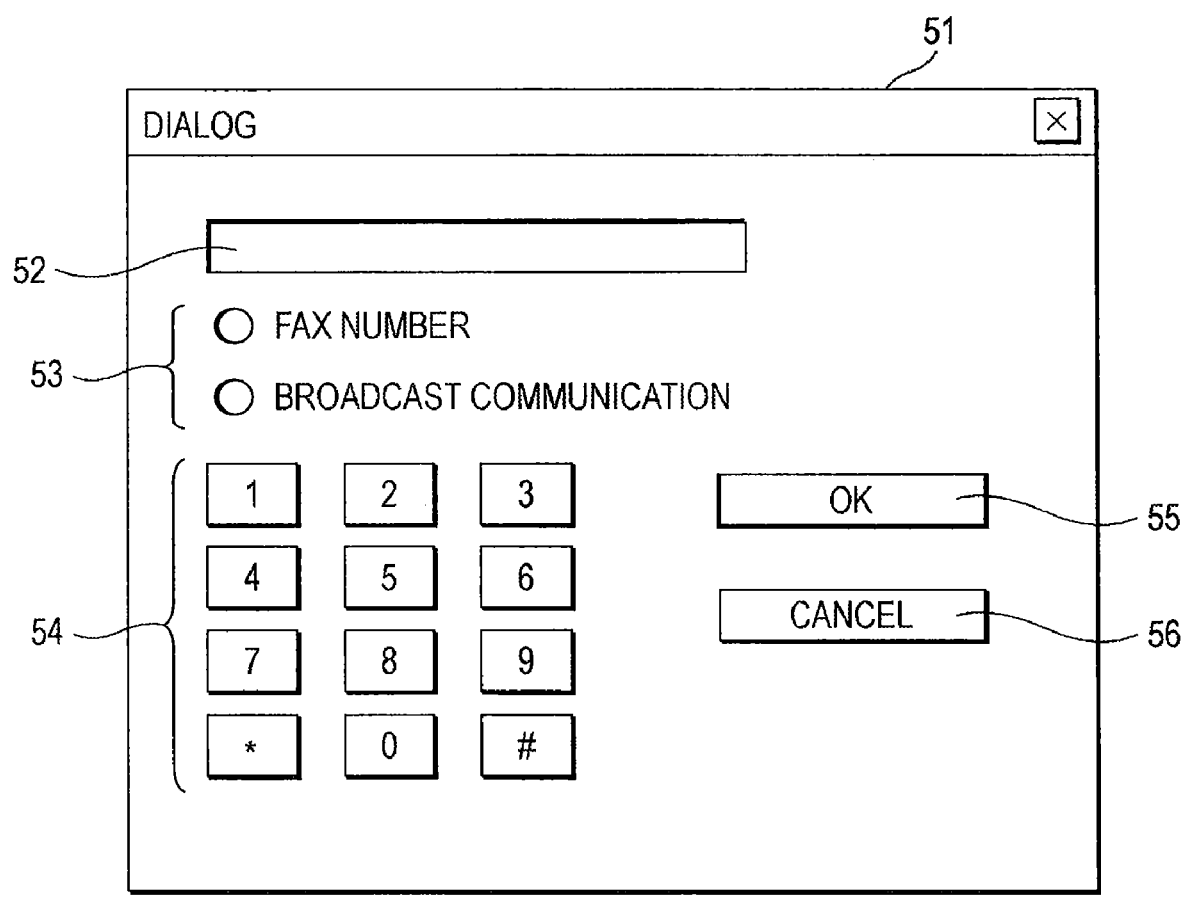
FIG. 4 is an explanatory view of dialog.

In the process for acquiring the destination (from S-120 to S230 as will be described later), the PC 1 firstly displays a dialog 51 as shown in FIG. 4 (S120), and waits for the input (S130). In the dialog 51, there are a transmission destination display window 52 for displaying the FAX number inputted by the user or the path name of the file storing the FAX numbers of transmission destination by broadcast communication, the radio button 53 for designating which of the FAX number and the broadcast communication file is used to transmit the FAX, a ten key 54 for inputting the number or symbol, an OK key 55 and a CANCEL key 56. The one of the radio buttons 53 can be selected by manipulating the mouse to position the cursor on it and clicking the mouse button. For the ten key 54, the OK key 55 and the CANCEL key 56, its function can be set up by manipulating the mouse to position the cursor and clicking the mouse button. The OK key 55 is the key for instructing that the input of transmission destination is completed. If this OK key 55 is operated, the image data to be transmitted is stored in the spool file through a process as will be described later. The image stored in the spool file is in the postscript (registered trademark) format. When the FAX number is inputted, the FAX number of the radio button 53 is designated, and the FAX number is inputted employing the ten key 54 or the ten key provided on the keyboard in the operation unit 15. When the broadcast communication is performed, the broadcast communication of the radio button 53 is designated, and the path name of the broadcast communication file is inputted employing the keys provided on the keyboard.

Subsequently, the PC 1 captures the input data inputted from the dialog 51 or the keyboard at step S130 (S140). It is judged whether or not the captured input data is the OK key 55 (S150).

If it is judged at step S150 that the captured input data is not the OK key 55 (S150: NO), it is judged whether or not the input data is the CANCEL key 56 (S160). If the captured input data is the CANCEL key 56 (S160: YES), this front end process is ended, whereas if the captured input data is not the CANCEL key 56 (S160: NO), it is judged whether or not the captured input data instructs the switching of the radio button 53 (S170). If the captured input data instructs the switching of the radio button 53 (S170: YES), the radio button 53 is switched (S180), whereas if the captured input data does not instruct the switching of the radio button 53 (S170: NO), it is considered that the number or character data is inputted, whereby the input data is displayed in the transmission destination display window 52 (S190). If the step S180 or S190 is ended, the procedure returns to step S130.

On the other hand, if it is judged at step S150 that the captured input data is the OK key 55 (S150: YES), it is investigated whether or not the radio button 53 is set to the FAX number or the broadcast communication (S200). If the radio button 53 is set to the FAX number (S200: FAX number), the option character string "fax-number=" indicating that the following character string is the FAX number is created (S210), because the FAX number of transmission destination is displayed in the transmission destination display window 52.

On the other hand, if the radio button 53 is set to the broadcast communication (S200: broadcast communication), the option character string "fax-broadcast=" indicating that the following character string is the path name of the broadcast communication file is created (S220), because the path name of the file describing the transmission destination of broadcast communication is displayed in the transmission destination display window 52.

And if the step S210 or S220 is ended, the character string displayed in the transmission destination display window 52 is added to the option character string (S230).

The steps S120 to S230 as above is the process for acquiring the destination using the dialog (see FIG. 4), whereby the option character string is created through the above one series of processes. On the other hand, the option character string may be directly designated in the command line by the user, in which it is already judged at step S110 that the destination exists (S110: YES).

Thus, if the step S230 is ended, or if the affirmative judgment is made at step S110 (S110: YES), then a file information conversion process is performed (S240). This file information conversion process involves converting the path name of the file included in the option character string from the first description format of including "the character string possibly meaning another directory for each process" into the second description format of not including "the character string possibly meaning another directory for each process". The step S240 is particularly shown in FIG. 5.

That is, if the file information conversion process is started, the PC 1 firstly judges whether or not there is "fax-broadcast=" in the command line (S310). Herein, the character string described following the "fax-broadcast=" is the character string corresponding to the path name of the broadcast communication file, but if the "~ (tilde)" is included as the directory name at its top, the "~ (tilde)" indicates the home directory of the user. However, where the home directory of the user is (=which absolute path the directory has) is stored as the environmental variable that can be referred to from the user process alone. Therefore, even if the path name with the "~ (tilde)" described as the directory name at the top is directly passed to the process of the system, it is not possible to refer to the environmental variable of individual user on the side of the system process, whereby the file having such path name can not be possibly accessed.

Figure 5:
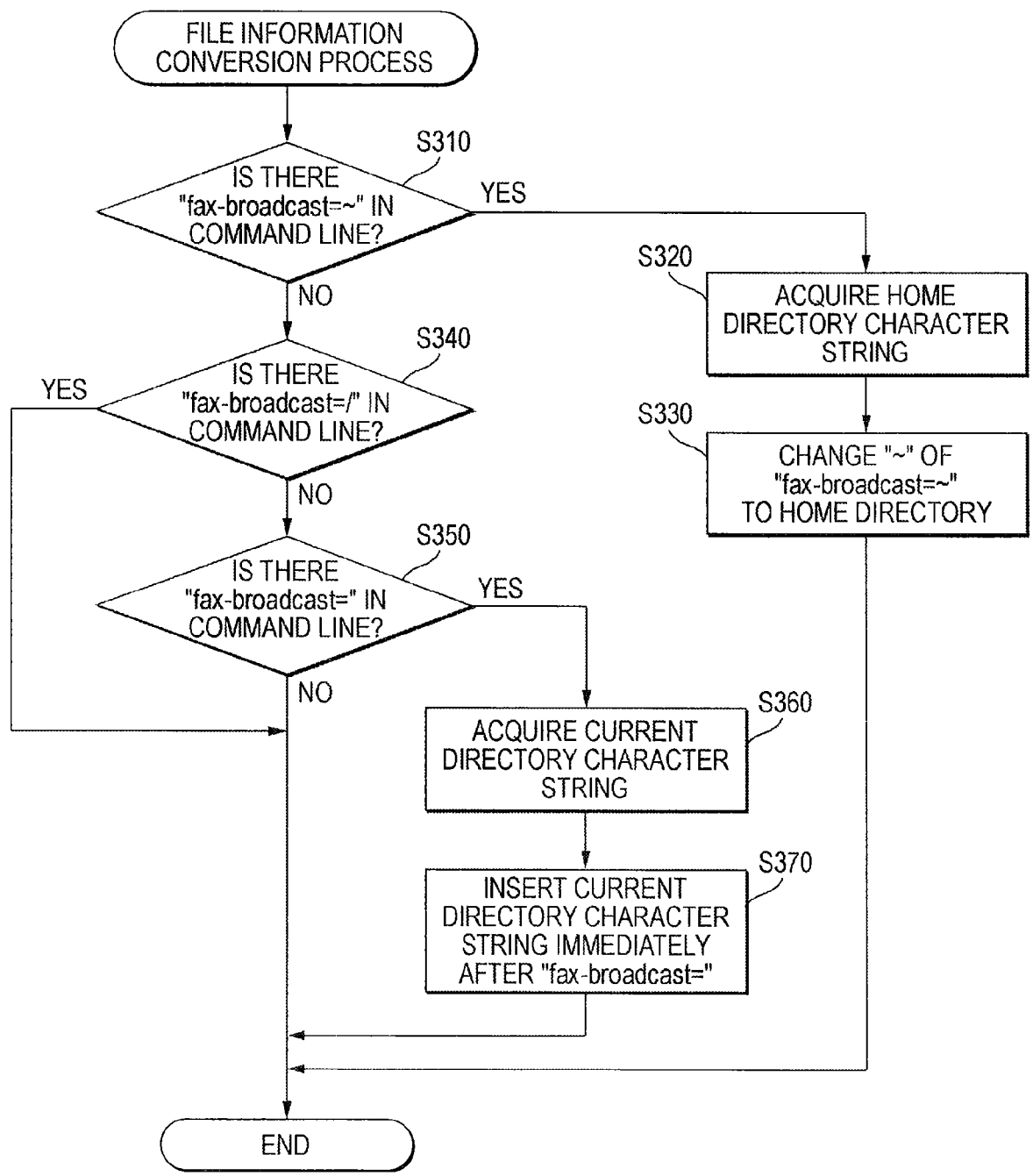
FIG. 5 is a flowchart of a file information conversion process according to a first aspect of the invention.

Thus, at step S310, if there is the "fax-broradcast=~" in the command line (S310: YES), the PC 1 acquires the character string indicating the home directory from the environmental variable (S320), and changes the "~" of the character string "fax-broadcast=~" in the command line to the home directory character string (S330), whereby the file information conversion process as shown in FIG. 5 is ended.

The steps S320 and S330 are performed, for example, when the "~address-list" is designated as the path name of the broadcast communication file. In this case, if the path name of the home directory stored as the environmental variable is "/home/aaa", the path name is changed to "/home/aaa/address-list" at the steps S320 and S330.

On the other hand, at step S310, if the "fax-broadcast=~" does not exist in the command line (S310: NO), the PC 1 judges whether or not there is the "fax-broadcast=/" in the command line (S340). Since the character string described following the "fax-broadcast=" corresponds to the path name of the broadcast communication file, as already explained, it is judged that the path name is described in the absolute path if the "/(slash)" is included as the directory name at its top. If the path name of the file is designated in the absolute path, the file having such path name can be accessed from any process, whether the user process or the system process.

Thus, at step S340, if there is the "fax-broadcast=/" in the command line (S340: YES), the file information conversion process as shown in FIG. 5 is ended without changing the path name. Such process is performed, for example, when the "/home/aaa/address-list" is designated as the path name of the broadcast communication file, in which the path name remains the "/home/aaa/address-list".

On the other hand, at step S340, if there is the "fax-broadcast=/" in the command line (S340: NO), the PC 1 judges whether or not there is the "fax-broadcast=" in the command line (S350). Herein, if there is the "fax-broadcast=" in the command line, it is judged that the path name is described in the relative path from the current directory. However, where the current directory of the user process is (=which absolute path the directory has) is stored as the environmental variable that can be referred to from the user process alone. Therefore, even if the relative path name is directly delivered to the process, the environmental variable of individual user can not be referred to on the side of the system process, whereby the file having such relative path name cannot be possibly accessed.

Thus, at step S350, if there is the "fax-broadcast=" in the command line (S350: YES), the character string indicating the current directory is acquired from the environmental variable (S360), and the character string indicating the current directory is inserted directly after the "fax-broadcast=" in the command line (S370), whereby the file information conversion process as shown in FIG. 5 is ended.

The steps S360 an S370 are performed, for example, when the "address-list" is designated as the path name of the broadcast communication file. In this case, if the path name of the current directory stored as the environmental variable is "/home/aaa/cur", the path name is changed to "/home/aaa/cur/address-list" at the steps S360 and S370. Also, if the "../address-list" is designated as the path name of the broadcast communication file, the steps S360 and S370 are performed. In this case, if the path name of the current directory stored as the environmental variable is "/home/aaa/cur", the path name is changed to "/home/aaa/cur/. . . /address-list" at the steps S360 and S370. The "..(two periods)" is the character string meaning the directory of one rank higher than the current directory, and the "/home/aaa/cur/../address-list" is synonymous with the "/home/aaa/address-list". In addition, the ". (one period)" is the character string meaning the current directory, and if the "./address-list" is designated as the path name, the path name is changed to the "/home/aaa/cur/./address-list", which is synonymous with the "/home/aaa/cur/address-list".

At step S350, if there is not the "fax-broadcast=" in the command line (S350: NO), it follows that the "designation of broadcast communication file" to be processed itself does not exist in the command line, whereby the file information conversion process as shown in FIG. 5 is directly ended.

If the above file information conversion process is ended, the step S240 as shown in FIG. 4 is ended. Subsequently, the PC 1 adds the option character string already processed at the step S240 to the LPR command (S250), and the following data process is passed to the CUPS LPR command unit 43. Then the front end process is ended.

Figure 6:
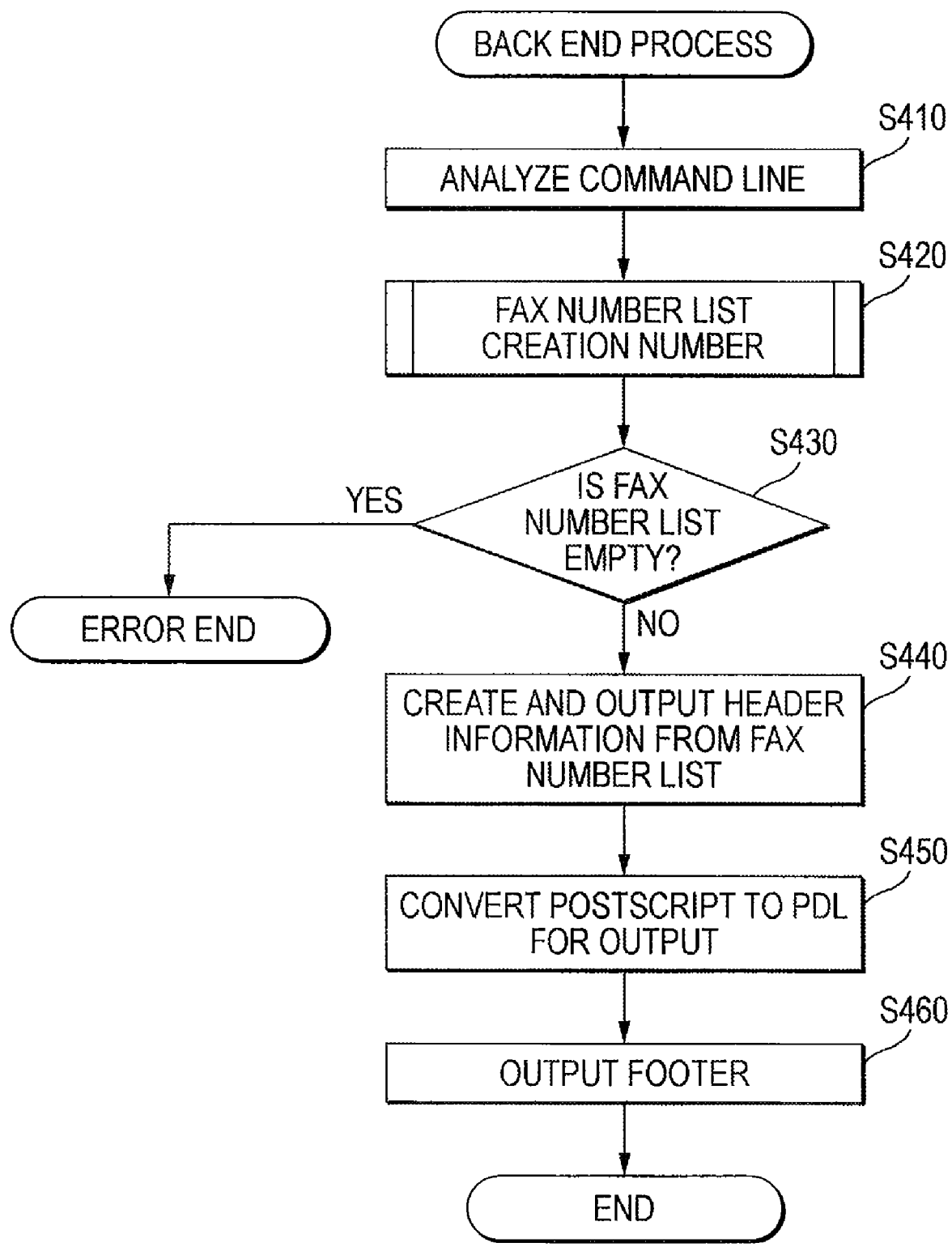
FIG. 6 is a flowchart of a back end process.

Referring to FIG. 6, a process (back end process) performed by the CUPS back end unit 45 will be described below.

Figure 7:
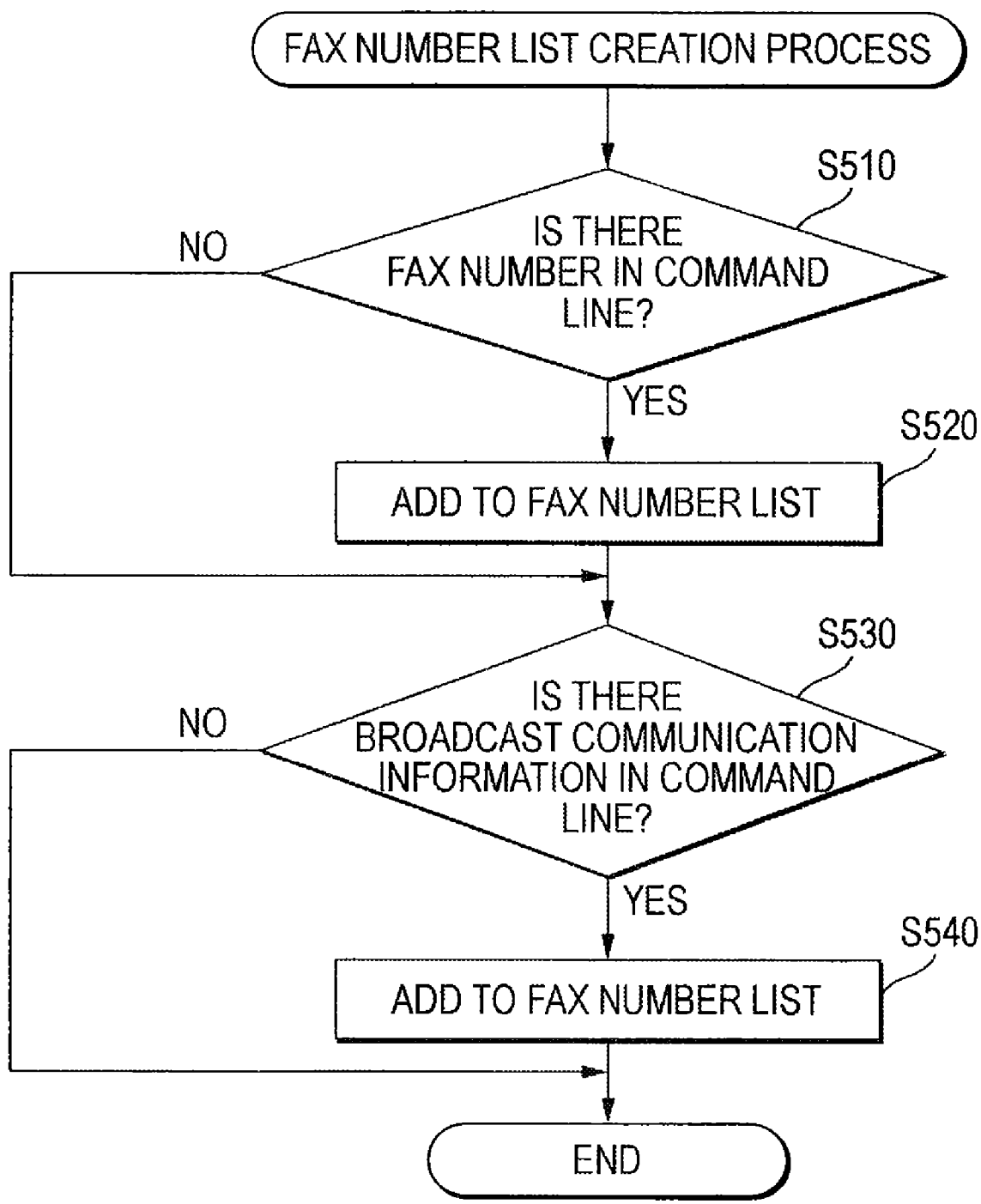
FIG. 7 is a flowchart of a FAX number list creation process according to the first aspect.

If this process is started, the PC 1 firstly analyzes the option in the command line of an LPR command (S410), and performs a FAX number list creation process (S420). This FAX number list creation process involves creating a list of FAX numbers to which the facsimile image is transmitted by broadcast communication on the side of the CUPS back end unit 45 by performing the process paired with the file information conversion process performed in the front end unit 42. The details of the step S420 are shown in FIG. 7.

That is, if the FAX number list creation process is started, the PC 1 firstly judges whether or not the FAX number of transmission destination is added as the option to the command line (S510). If the FAX number of transmission destination is added as the option to the command line (S510: YES), its FAX number is stored in the FAX number list (S520). This FAX number list is a transmission destination list stored in a temporary area of the RAM 13, for example.

If the FAX number of transmission destination is not added as the option to the command line (S510: NO), or if the step S520 is ended, it is judged whether or not the path name of broadcast communication file is added as the option to the command line (S530). If the path name of broadcast communication file is added as the option to the command line (S530: YES), the FAX number stored in the broadcast communication file is read and its FAX number is added to the FAX number list (S540). The path name of the broadcast communication file accessed at the step S540 is the path name to be converted in the file information conversion process (see FIG. 5). Accordingly, the broadcast communication file can be accessed in the absolute path name without acquiring the environmental variable intrinsic to the user process at the step S540.

If the path name of the broadcast communication file is added as the option to the command line (S530: NO), or if the step S540 is ended, the FAX number list creation process as shown in FIG. 7 is ended.

In this way, if the FAX number list creation process is ended, it follows that the step S420 as shown in FIG. 6 is ended. Subsequently, the PC 1 judges whether or not the FAX number list stored in the temporary area is empty (S430). If the FAX number list is empty (S430: YES), it follows that there is no designation of the transmission destination, whereby the back end process is ended in error.

On the other hand, if it is judged at the step S430 that the FAX number list is not empty (S430: NO), the header information describing the FAX number of transmission destination stored in the FAX number list is created (S440), the transmission data described in the postscript (registered trademark) format that is read from the spool file is converted into the PDL and outputted (S450), and finally the footer is outputted, whereby the back end process is ended. Through the steps S440 to S460, the FAX number list and the image data of facsimile image are transmitted from the CUPS back end unit 45 via the network control unit 46 to the facsimile apparatus 2. Thereafter, the facsimile image is transmitted with the broadcast communication function on the side of the facsimile apparatus 2.

As described above, with the image data transmission system provided for the PC 1 according to the first aspect, even if the path name of the broadcast communication file designated by the user at will is designated in the description format (e.g., relative path, path beginning with "~ (tilde)" and so on) including the character string possibly meaning another directory for each process, the front end unit 42 expands the path name designated in the above description format into the description format (absolute path) not including the character string possibly meaning another directory for each process, based on the environmental variable to which the front end unit 42 can refer, and its path name is transmitted to the CUPS back end unit 45, whereby the CUPS back end unit 45 can access the broadcast communication file existing in the directory as intended by the user, even if the CUPS back end unit 45 can not refer to the intrinsic environmental variable to which the front end unit 42 can refer, and can properly perform the process for instructing the facsimile apparatus 2 to "transmit the image data to the transmission destination indicated by the FAX number" by referring to the FAX number stored in the broadcast communication file.

A second aspect will be described below. This second aspect is different from the first aspect in the file information conversion process (see FIG. 5) and the FAX number creation process (see FIG. 7) which are performed in the first aspect, but the same in the other processes and the hardware configuration as the first aspect. Thus, in the following, only the different points from the first aspect will be described below in detail, in which the same parts as in the first aspect employ the same signs as in the first aspect, and are not described here in detail.

Figure 8:
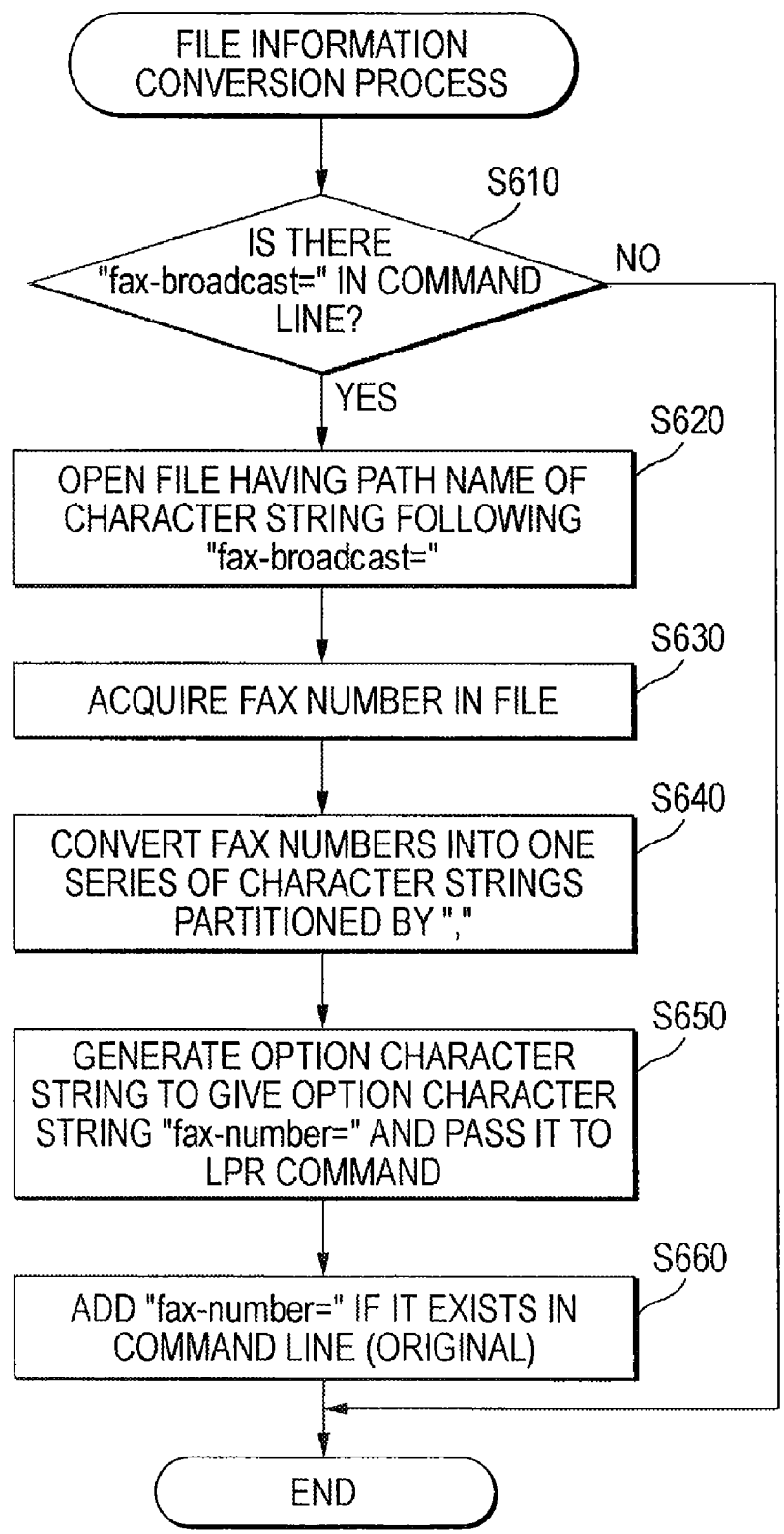
FIG. 8 is a flowchart of a file information conversion process according to a second aspect of the invention.

Referring to FIG. 8, first of all, the file information conversion process (step S240 as shown in FIG. 3) performed in the front end unit 42 will be described below. The file information conversion process of the second aspect, unlike the file information conversion process of the first aspect, is the process for reading the data stored in the file from the file and expanding the read data itself into the command line, if the path name of the file is included in the command line.

That is, if the file information conversion process is started, the PC 1 firstly judges whether or not there is the "fax-broadcast=" in the command line (S610). Herein, if the "fax-broadcast=" does not exist in the command line (S610: NO), the broadcast communication file to be processed is not designated, whereby the file information conversion process as shown in FIG. 8 is directly ended.

On the other hand, if there is the "fax-broadcast=" in the command line (S610: YES), the file having the path name of the character string following the "fax-broadcast=" is opened (S620), and the FAX number is acquired from the file (S630). And all the FAX numbers acquired from the file are converted into a series of character strings partitioned by ", (comma)" (S640), and the option character string "fax-number=" is appended to its top to generate the option character string passed to the LPR command (S650). Further, if the "fax-number=" also exists in the command line of the original designated by the user, it is appended to the option character string generated at the step S650 (S660). Then, the file information conversion process as shown in FIG. 8 is ended.

In the second aspect, the above file information conversion process is performed at the step S240 as shown in FIG. 3.

Figure 9:
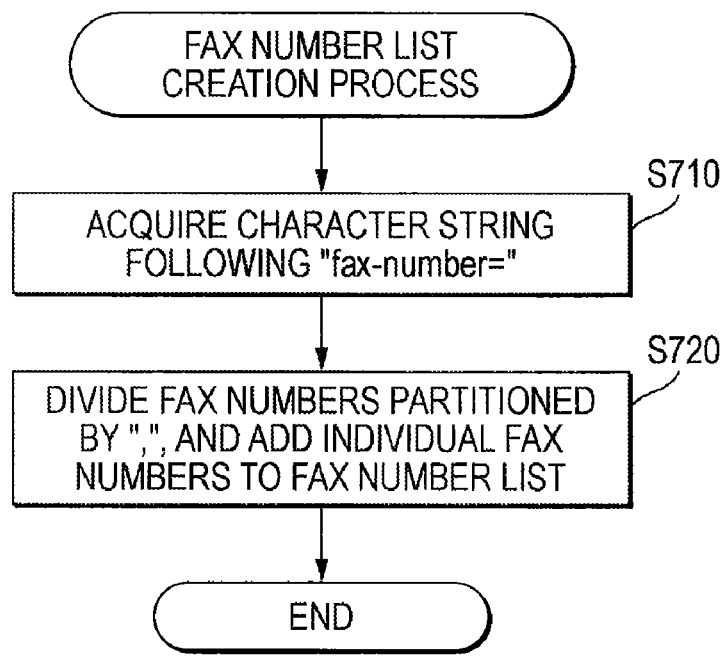
FIG. 9 is a flowchart of a FAX number list creation process according to the second aspect.

Referring to FIG. 9, the FAX number list creation process (step S420 as shown in FIG. 6) performed in the CUPS back end unit 45 will be described below.

If this process is started, the PC 1 firstly acquires the character string following the "fax-number=" (S710). The character string acquired at the step S710 is the character string expanded at the step S640. Subsequently, the PC 1 divides the FAX numbers partitioned by "," in the character string acquired at the step S710 into individual FAX numbers, and adds the FAX numbers to the FAX number list (S720), whereby the FAX number list creation process as shown in FIG. 9 is ended.

In the second aspect, the above FAX number list creation process is performed at the step S420 as shown in FIG. 6.

As described above, with the image data transmission system provided for the PC 1 according to the second aspect, even if the path name of the broadcast communication file designated by the user at will is designated in the description format (e.g., relative path, path beginning with "~ (tilde)" and so on) including the character string possibly meaning another directory for each process, the front end unit 42 can access the broadcast communication file with the path name designated in the description format, based on the environmental variable to which the front end unit 42 can refer. The front end unit 42 reads the FAX number stored in the designated broadcast communication file and expands the FAX number into the command line which is then transmitted to the CUPS back end unit 45, whereby the CUPS back end unit 45 can acquire the FAX number read from the broadcast communication file existing in the directory as intended by the user, even if it can not refer to the intrinsic environmental variable to which the front end unit 42 can refer, and can properly perform the process for instructing the facsimile apparatus 2 to "transmit the image data to the destination indicated by the FAX number" by referring to the FAX number.

A third aspect will be described below. The third aspect is different from the first aspect in the file information conversion process (see FIG. 5) and the FAX number creation process (see FIG. 7) performed in the first aspect, but the same in the other processes and the hardware configuration as the first aspect. Thus, in the following, only the different points from the first aspect will be described below in detail, as in the second aspect, and the same parts as in the first aspect employ the same signs as in the first aspect, and are not described here in detail.

Figure 10:
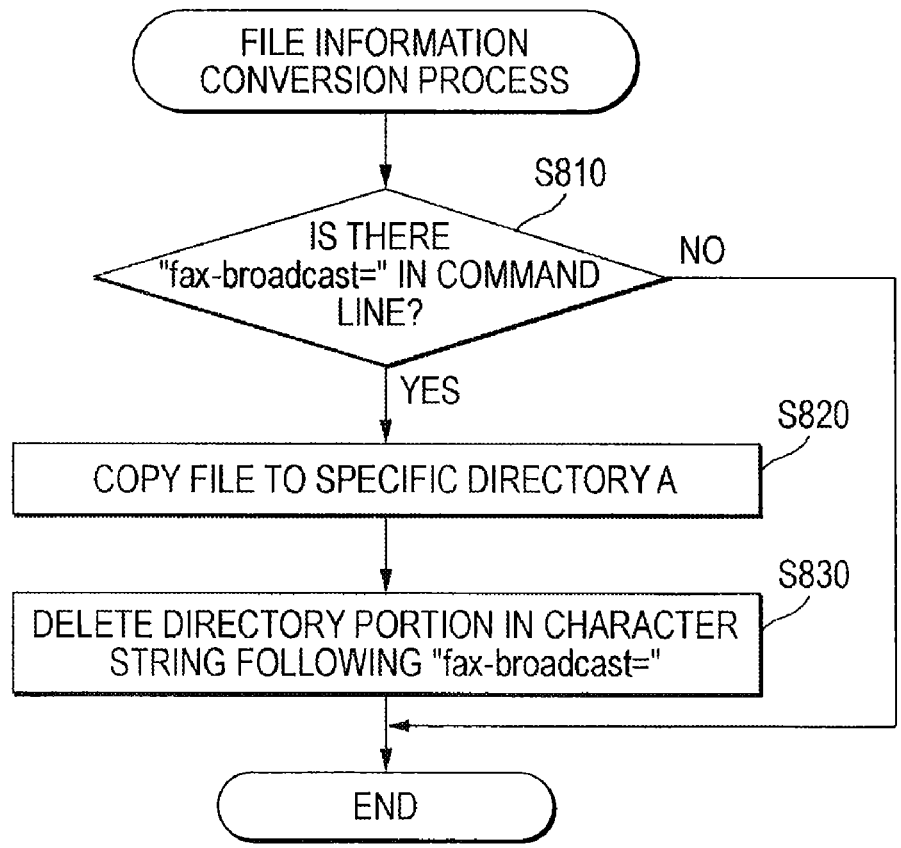
FIG. 10 is a flowchart of a file information conversion process according to a third aspect of the invention.

Referring to FIG. 10, first of all, the file information conversion process (step S240 as shown in FIG. 3) performed in the front end unit 42 will be described below. The file information conversion process of the third-aspect, unlike the file information conversion process of the first or second aspect, involves copying the file to a specific directory accessible from the system process, and acquiring the same file data as the copy source file by accessing the copy destination file, if the path name of the file is included in the command line.

That is, if the file information conversion process is started, the PC 1 firstly judges whether or not there is the "fax-broadcast=" in the command line (S810). Herein, if the "fax-broadcast=" does not exist in the command line (S810: NO), the broadcast communication file to be processed is not designated, whereby the file information conversion process as shown in FIG. 10 is directly ended.

On the other hand, if there is the "fax-broadcast=" in the command line (S810: YES), the file (broadcast communication file) having the path name of the character string following the "fax-broadcast=" is copied to a specific directory A (S820). The specific directory A may have any specific path name, if the same directory can be specified with the path name from any process. For example, the specific directory may have the predetermined absolute path name.

And if the broadcast communication file is copied, the PC 1 deletes the directory portion in the character string following the "fax-broadcast=" (S830), and the file information conversion process as shown in FIG. 10 is ended.

In the third aspect, the above file information conversion process is performed at the step S240 as shown in FIG. 3.

Figure 11:
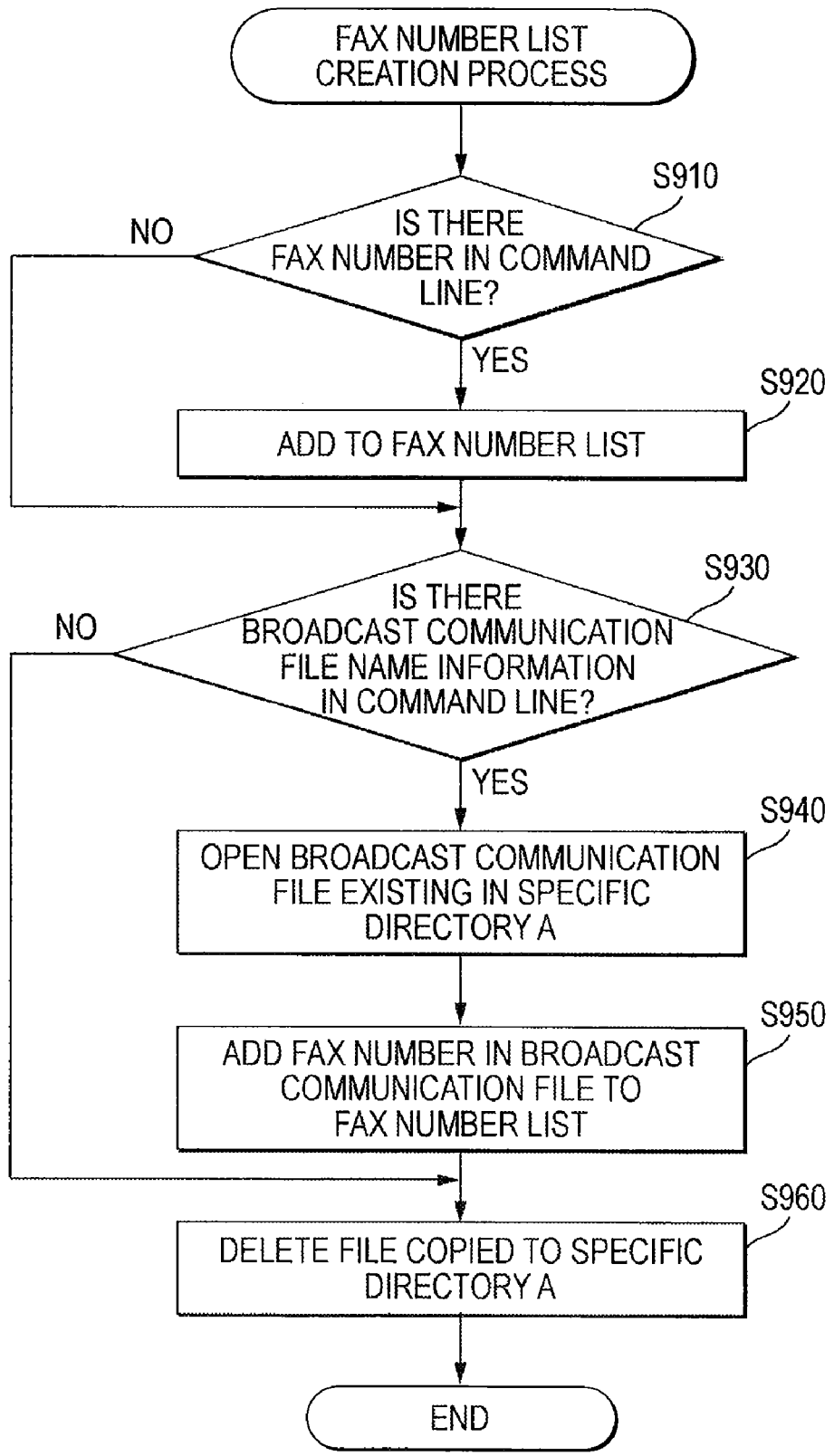
FIG. 11 is a flowchart of a FAX number list creation process according to the third aspect.

Referring to FIG. 11, the FAX number list creation process (step S420 as shown in FIG. 6) performed in the CUPS back end unit 45 will be described below.

If this process is started, the PC 1 firstly judges whether or not the FX number exists in the command line (S910). If the FAX number exists in the command line (S910: YES), the FAX number is added to the FAX number list (S920).

If the FAX number does not exist in the command line (S910: NO), or if the step S920 is ended, it is judged whether or not the path name of the broadcast communication file exists as the option in the command line (S930). If the path name of the broadcast communication file is appended as the option to the command line (S930: YES), the directory portion for its path name is deleted at the step S830, and the portion of the file name only is left. Also, the file having the same file name is copied to the above specific directory.

Thus, the PC 1 opens the broadcast communication file specified in the common line (copy destination file) existing in the specific directory A (S940), reads the FAX number stored in its broadcast communication file, and adds its FAX number to the FAX number list (S950).

If the path name of the broadcast communication file is not appended as the option to the command line (S930: NO), or if the step S950 is ended, the broadcast communication file copied to the specific directory A is deleted (S960), and the FAX number list creation process as shown in FIG. 11 is ended.

In the third aspect, the above FAX number list creation process is performed at the step S420 as shown in FIG. 6.

As described above, with the image data transmission system provided for the PC 1 according to the third aspect, even if the path name of the broadcast communication file designated by the user at will is designated in the description format (e.g., relative path, path beginning with "~ (tilde)" and so on) including the character string possibly meaning another directory for each process, the front end unit 42 can access the broadcast communication file with the path name designated in the above description format, based on the environmental variable to which the front end unit 42 can refer. Since the broadcast communication file is copied through the process in the front end unit 42 with the broadcast communication file as the copy source and with the file having the path name accessible from the CUPS back end unit 45 as the copy destination, the CUPS back end unit 45 can access the copy destination file to acquire the FAX number read from its copy destination file, even if it can not refer to the intrinsic environmental variable to which the front end unit 42 can refer, and can properly perform the process for instructing the facsimile apparatus 2 to "transmit the image data to the destination indicated by the FAX number" by referring to the FAX number.

While the aspects of the invention have been described above, the invention is not limited to the above specific aspects, but may be embodied in various other forms.

For example, in the above aspect, the process regarding the image data is the process for instructing the facsimile apparatus 2 to make the broadcast communication is exemplified, and as the data apart from the image data, the FAX number of the destination of the broadcast communication is stored in the file, and the path name of its file is conveyed to the lower layer process. However, the process regarding the image data may not be the process for instructing the facsimile apparatus 2 to make the broadcast communication. As a matter of course, in this case, the contents of the data stored in the file are not limited to the FAX number. That is, in the case where various kinds of data required in performing the data process regarding the image data are stored in the file, and its path name is conveyed to the lower layer process, the constitution of the invention may be employed.

In a more specific example, in transmitting the image data to a color printer, the calibration data is stored in the file, and its path name is conveyed to the lower layer process, whereby the color printing process referring to its calibration data can be instructed from the system process to the printer. Even in this case, even if the path name of the file designated in the user process can not be directly referred to from the system process, the constitution of the invention may be employed to access the file on the system process.

While in the above aspects, the image data in the postscript (registered trademark) format is transmitted, the image data may be in any specific format, such as PDF (Portable Document Format) format, as far as the data format is arbitrarily settled between processes or devices for transmitting the data.

According to the above aspects, in the first procedure section, when the character string which is at least one part of the path name of the file to be processed is the character string associated with the path name of the specific directory, the used character string is converted into the path name of the specific directory by referring to the environmental variable provided for the first procedure section, and the path name after conversion is provided to the second procedure section. Therefore, in the second procedure section, the file to be processed can be accessed appropriately, although the environmental variable provided for the first procedure section can not be referred to. Accordingly, a process regarding the image data including the data transmission process to the image processing device can be properly performed, using the file data read from the file to be processed and the image data acquired from the first procedure section in the second procedure section.

According to the above aspects, in the first procedure section, when the character string which is at least one part of the path name of the file to be processed is the character string associated with the path name of the specific directory, the used character string is converted into the path name of the specific directory, and the path name after conversion is provided to the second procedure section. Therefore, in the second procedure section, the file to be processed can be accessed appropriately, although the correspondence between the path name of the directory provided for the first procedure section and the character string can not be recognized. Accordingly, "a process for issuing a command of transmitting the image data acquired from the first procedure section to the transmission destination to the image processing device, with the FAX number read from the file to be processed as the transmission destination, can be properly performed in the second procedure section.

According to the above aspects, in the first procedure section, when the character string which is at least one part of the path name of the file to be processed is the character string associated with the path name of the specific directory, the file having such path name is easily accessed, and the file data stored in the file can be read and provided to the second procedure section. Therefore, in the second procedure section, the file data provided from the first procedure section can be acquired, although the correspondence between the path name of the directory provided for the first procedure section and the character string can not be recognized, whereby it is unnecessary to access the file. Accordingly, a process regarding the image data including the data transmission process to the image processing device can be properly performed, using the file data acquired from the first procedure section and the image data acquired from the first procedure section in the second procedure section.

According to the above aspects, in the first procedure section, when the character string which is at least one part of the path name of the file to be processed is the character string associated with the path name of the specific directory, the file having such path name is easily accessed by referring to the environmental variable provided for the first procedure section, and the file data stored in the file can be read and provided to the second procedure section. Also, in the second procedure section, the environmental variable provided for the first procedure section can not be referred to but the file data provided from the first procedure section can be acquired, whereby it is unnecessary to access the file. Accordingly, a process regarding the image data including the data transmission process to the image processing device can be properly performed, using the file data acquired from the first procedure section and the image data acquired from the first procedure section in the second procedure section.

According to the above aspects, in the first procedure section, when the character string which is at least one part of the path name of the file to be processed is the character string associated with the path name of the specific directory, the file having such path name is easily accessed, and the FAX number can be provided to the second procedure section by reading the FAX number stored in the file. Also, in the second procedure section, the FAX number provided from the first procedure section can be acquired, although the correspondence between the path name of the directory provided for the first procedure section and the character string can not be recognized, whereby it is unnecessary to access the file. Accordingly, "a process for issuing a command of transmitting the image data acquired from the first procedure section to the transmission destination to the image processing device, with the FAX number acquired from the first procedure section as the transmission destination, can be properly performed in the second procedure section.

According to the above aspects, in the first procedure section, when the character string which is at least one part of the path name of the file to be processed is the character string associated with the path name of the specific directory, the file having such path name is easily accessed, and the file can be copied from the file having such path name as the copy source to the file having the path name accessible from the second procedure section as the copy destination in the first procedure section. Also, in the second procedure section, the destination file copied in the first procedure section can be accessed, although the correspondence between the path name of the directory provided for the first procedure section and the character string can not be recognized, whereby it is unnecessary to access the copy source file. Accordingly, a process regarding the image data including the data transmission process to the image processing device can be properly performed, using the file data read from the destination file and the image data acquired from the first procedure section in the second procedure section.

According to the above aspects, in the first procedure section, when the character string which is at least one part of the path name of the file to be processed is the character string associated with the path name of the specific directory, the file having such path name is easily accessed by referring to the environmental variable for the first procedure section, and the file can be copied from the file having such path name as the copy source to the file having the path name accessible from the second procedure section as the destination in the first procedure section. Also, in the second procedure section, the environmental variable for the first procedure section can not be referred to, but the copy destination file copied in the first procedure section can be accessed, whereby it is unnecessary to access the copy source file. Accordingly, a process regarding the image data including the data transmission process to the image processing device can be properly performed, using the file data read from the copy destination file and the image data acquired from the first procedure section in the second procedure section.

According to the above aspects, in the first procedure section, when the character string which is at least one part of the path name of the file to be processed is the character string associated with the path name of the specific directory, the file having such path name is easily accessed, and the file can be copied from the file having such path name as the copy source to the file having the path name accessible from the second procedure section as the destination in the first procedure section. Also, in the second procedure section, the copy destination file copied in the first procedure section can be accessed, although the correspondence between the path name of the directory provided for the first procedure section and the character string can not be recognized, whereby it is unnecessary to access the copy source file. Accordingly, "a process for issuing a command of transmitting the image data acquired from the first procedure section to the transmission destination to the image processing device, with the FAX number read from the copy destination file as the transmission destination, can be properly performed in the second procedure section.

What is claimed is:

1. An image data transmission system which transmits data from a computer to an image processing device, the image data transmission system comprising:
   a first procedure section; and
   a second procedure section, wherein
   the first procedure section comprises:
      a path name acquisition unit that acquires a path name of a file;
      a directory path name specifying unit that specifies a path name of a directory associated with a character string which is at least one part of the path name acquired by the path name acquisition unit;
      a path name conversion unit that converts the character string which is at least one part of the path name acquired by the path name acquisition unit into the path name of the directory specified by the directory path name specifying unit;
      a converted path name providing unit that provides the path name converted by the path name conversion unit to the second procedure section; and
      an image data providing unit that provides image data to be processed to the second procedure section;
   the second procedure section comprises:
      a converted path name acquisition unit that acquires the path name provided from the first procedure section;
      a data reading unit that reads file data stored in the file specified by the path name acquired by the converted path name acquisition unit;
      an image data acquisition unit that acquires the image data provided from the first procedure section; and
      a data processing unit that performs a process of the image data, using the file data read by the data reading unit and the image data acquired by the image data acquisition unit; and
   different pathnames are specified by the first procedure section and the second procedure section with respect to the same character string.

2. The image data transmission system according to claim 1, wherein:
   the first and second procedure sections refers to an environmental variable with respect to the path name of the directory corresponding to the character string for each process; and
   the directory path name specifying unit specifies the path name of the directory associated with the character string which is at least one part of the path name acquired by the path name acquisition unit by referring to the environmental variable provided for the first procedure section.

3. The image data transmission system according to claim 1, wherein:
   the image processing device is a facsimile apparatus that can transmit the image data transmitted from the computer to a transmission destination designated by a FAX number;
   the path name acquisition unit provided for the first procedure section acquires the path name of the file storing the FAX number as the file data; and
   the data processing unit provided for the second procedure section performs a process for issuing a command of transmitting the image data acquired by the image data acquisition unit to the transmission destination to the image processing device, with the FAX number read by the data reading unit as the transmission destination.

4. An image data transmission system which transmits data from a computer to an image processing device, the image data transmission system comprising:
- a first procedure section; and
- a second procedure section, wherein:
- the first procedure section comprises:
  - a path name acquisition unit that acquires a path name of a file;
  - a data reading unit that reads file data stored in the file having the path name based on the path name acquired by the path name acquisition unit;
  - a file data providing unit that provides the file data read by the data reading unit to the second procedure section; and
  - an image data providing unit that provides the image data to be processed to the second procedure section;
- the second procedure section comprises:
  - a file data acquisition unit that acquires the file data provided from the first procedure section;
  - an image data acquisition unit that acquires the image data provided from the first procedure section; and
  - a data processing unit that performs a process of the image data, using the file data acquired by the file data acquisition unit and the image data acquired by the image data acquisition unit; and
- different pathnames are specified by the first procedure section and the second procedure section with respect to the same character string.

5. The image data transmission system according to claim 4, wherein:
- the first and second procedure sections refers to an environmental variable with respect to the path name of the directory corresponding to the character string for each process; and
- the data reading unit reads the file data stored in the specified file by specifying the file having the path name acquired by the path name acquisition unit by referring to the environmental variable provided for the first procedure section.

6. The image data transmission system according to claim 4, wherein:
- the image processing device is a facsimile apparatus that can transmit the image data transmitted from the computer to a transmission destination designated by a FAX number;
- the path name acquisition unit provided for the first procedure section acquires the path name of the file storing the FAX number as the file data; and
- the data processing unit provided for the second procedure section performs a process for issuing a command of transmitting the image data acquired by the image data acquisition unit to the transmission destination to the image processing device, with the FAX number acquired by the file data acquisition unit as the transmission destination.

7. An image data transmission system which transmits data from a computer to an image processing device, the image data transmission system comprising:
- a first procedure section; and
- a second procedure section, wherein:
- the first procedure section comprises:
  - a path name acquisition unit that acquires a path name of a file;
  - a file copying unit that copies a file from a file having the path name acquired by the path name acquisition unit as a copy source to a file having the path name accessible from the second procedure section as a copy destination; and
  - an image data providing unit that provides image data to be processed to the second procedure section;
- the second procedure section comprises:
  - a data reading unit that reads file data stored in the copy destination file that is copied in the first procedure section;
  - an image data acquisition unit that acquires the image data provided from the first procedure section; and
  - a data processing unit that performs a process of the image data, using the file data read by the data reading unit and the image data acquired by the image data acquisition unit; and
- different pathnames are specified by the first procedure section and the second procedure section with respect to the same character string.

8. The image data transmission system according to claim 7, wherein:
- the first and second procedure sections refers to an environmental variable with respect to the path name of the directory corresponding to the character string for each process; and
- the file copying unit copies the file from the specified file as the copy source to the file having the path name accessible from the second procedure section as the copy destination by specifying the file having the path name acquired by the path name acquisition unit by referring to the environmental variable provided for the first procedure section.

9. The image data transmission system according to claim 7, wherein:
- the image processing device is a facsimile apparatus that can transmit the image data transmitted from the computer to a transmission destination designated by the FAX number;
- the path name acquisition unit provided for the first procedure section acquires the path name of the file storing the FAX number as the file data; and
- the data processing unit provided for the second procedure section performs a process for issuing a command of transmitting the image data acquired by the image data acquisition unit to the transmission destination to the image processing device, with the FAX number read by the data reading unit as the transmission destination.

* * * * *

UNITED STATES PATENT AND TRADEMARK OFFICE
CERTIFICATE OF CORRECTION

PATENT NO. : 7,644,104 B2
APPLICATION NO. : 11/565122
DATED : January 5, 2010
INVENTOR(S) : Masatoshi Kadota Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Twenty-first Day of December, 2010

David J. Kappos
*Director of the United States Patent and Trademark Office*